United States Patent
Davydov et al.

(10) Patent No.: US 10,271,304 B2
(45) Date of Patent: Apr. 23, 2019

(54) PHYSICAL RESOURCE BLOCK (PRB)-RESTRICTED INTERFERENCE AVERAGING IN A WIRELESS COMMUNICATION SYSTEM

(71) Applicant: Intel IP Corporation, Santa Clara, CA (US)

(72) Inventors: Alexei Davydov, Nizhny Novgorod (RU); Seunghee Han, San Jose, CA (US); Yuan Zhu, Beijing (CN); Alexander Maltsev, Nizhny Novgorod (RU); Gregory Morozov, Nizhny Novgorod (RU); Xiaogang Chen, Beijing (CN)

(73) Assignee: Intel IP Corporation, Santa Clara, CA (US)

( * ) Notice: Subject to any disclaimer, the term of this patent is extended or adjusted under 35 U.S.C. 154(b) by 236 days.

(21) Appl. No.: 14/764,547

(22) PCT Filed: Dec. 13, 2013

(86) PCT No.: PCT/US2013/075139
§ 371 (c)(1),
(2) Date: Jul. 29, 2015

(87) PCT Pub. No.: WO2014/133642
PCT Pub. Date: Sep. 4, 2014

(65) Prior Publication Data
US 2015/0365960 A1    Dec. 17, 2015

Related U.S. Application Data

(60) Provisional application No. 61/771,698, filed on Mar. 1, 2013.

(51) Int. Cl.
*H04W 72/00* (2009.01)
*H04B 7/0456* (2017.01)
(Continued)

(52) U.S. Cl.
CPC ........ *H04W 72/005* (2013.01); *H04B 7/0452* (2013.01); *H04B 7/0486* (2013.01);
(Continued)

(58) Field of Classification Search
CPC .................................................. H04W 72/005
See application file for complete search history.

(56) References Cited

U.S. PATENT DOCUMENTS 8,201,042 B2 *   6/2012   Frederiksen ......... H04L 1/1812
                                                          714/748
8,289,917 B1 *   10/2012  Koivisto ............... H04L 5/0048
                                                          370/252
(Continued)

FOREIGN PATENT DOCUMENTS

WO    2010/065280 A2    6/2010
WO    WO 2013-025558 A1    2/2013

OTHER PUBLICATIONS

Extended European Search Report dated Sep. 22, 2016 from European Patent Application No. 13876544.1, 9 pages.
(Continued)

*Primary Examiner* — Raj Jain
*Assistant Examiner* — Andrew C Lee
(74) *Attorney, Agent, or Firm* — Schwabe, Williamson & Wyatt, P.C.

(57) ABSTRACT

Methods, apparatuses, and systems are described related to interference averaging to generate feedback information. In embodiments, an evolved Node B (eNB) may transmit an feedback management message to a user equipment (UE) that defines one or more PRB sets. The PRB sets may include at least one PRB of the channel. The UE may average interference measurements within the PRB set and may generate channel state information (CSI) feedback for
(Continued)

the PRB set based on the average interference measurement. The UE may transmit the CSI feedback to the eNB.

23 Claims, 5 Drawing Sheets

(51) Int. Cl.

| | |
|---|---|
| *H04B 7/0452* | (2017.01) |
| *H04W 36/14* | (2009.01) |
| *H04W 36/22* | (2009.01) |
| *H04L 5/00* | (2006.01) |
| *H04L 12/741* | (2013.01) |
| *H04B 7/06* | (2006.01) |
| *H04W 24/10* | (2009.01) |
| *H04W 72/04* | (2009.01) |
| *H04W 72/08* | (2009.01) |
| *H04L 29/06* | (2006.01) |
| *H04L 29/08* | (2006.01) |
| *H04W 4/10* | (2009.01) |
| *H04W 12/02* | (2009.01) |
| *H04W 12/04* | (2009.01) |
| *H04W 24/02* | (2009.01) |
| *H04W 24/08* | (2009.01) |
| *H04L 12/18* | (2006.01) |
| *H04W 52/24* | (2009.01) |
| *H04W 72/10* | (2009.01) |
| *H04W 16/14* | (2009.01) |
| *H04W 36/16* | (2009.01) |
| *H04W 36/30* | (2009.01) |
| *H04J 3/12* | (2006.01) |
| *H04W 48/10* | (2009.01) |
| *H04W 48/20* | (2009.01) |
| *H04M 15/00* | (2006.01) |
| *H04L 25/03* | (2006.01) |
| *H04W 76/23* | (2018.01) |
| *H04W 76/14* | (2018.01) |
| *H04W 76/27* | (2018.01) |
| *H04W 76/10* | (2018.01) |
| *H04W 76/20* | (2018.01) |
| *H04W 76/30* | (2018.01) |
| *H04W 4/80* | (2018.01) |
| *H04W 88/06* | (2009.01) |
| *H04W 88/02* | (2009.01) |
| *H04W 88/08* | (2009.01) |
| *H04W 84/18* | (2009.01) |
| *H04W 4/06* | (2009.01) |

(52) U.S. Cl.
CPC .............. *H04B 7/0626* (2013.01); *H04J 3/12* (2013.01); *H04L 5/0037* (2013.01); *H04L 12/184* (2013.01); *H04L 25/03* (2013.01); *H04L 45/74* (2013.01); *H04L 65/4038* (2013.01); *H04L 65/608* (2013.01); *H04L 65/80* (2013.01); *H04L 67/02* (2013.01); *H04M 15/8044* (2013.01); *H04W 4/10* (2013.01); *H04W 12/02* (2013.01); *H04W 12/04* (2013.01); *H04W 16/14* (2013.01); *H04W 24/02* (2013.01); *H04W 24/08* (2013.01); *H04W 24/10* (2013.01); *H04W 36/14* (2013.01); *H04W 36/165* (2013.01); *H04W 36/22* (2013.01); *H04W 36/30* (2013.01); *H04W 48/10* (2013.01); *H04W 48/20* (2013.01); *H04W 52/244* (2013.01); *H04W 72/044* (2013.01); *H04W 72/0406* (2013.01); *H04W 72/085* (2013.01); *H04W 72/087* (2013.01); *H04W 72/10* (2013.01); *H04W 76/10* (2018.02); *H04W 76/14* (2018.02); *H04W 76/20* (2018.02); *H04W 76/23* (2018.02); *H04W 76/27* (2018.02); *H04W 76/30* (2018.02); *H04W 4/06* (2013.01); *H04W 4/80* (2018.02); *H04W 84/18* (2013.01); *H04W 88/02* (2013.01); *H04W 88/06* (2013.01); *H04W 88/08* (2013.01); *Y02B 70/32* (2013.01); *Y02D 70/00* (2018.01); *Y02D 70/1224* (2018.01); *Y02D 70/1242* (2018.01); *Y02D 70/1244* (2018.01); *Y02D 70/1246* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/162* (2018.01); *Y02D 70/164* (2018.01); *Y02D 70/166* (2018.01); *Y02D 70/168* (2018.01); *Y02D 70/21* (2018.01); *Y02D 70/22* (2018.01); *Y02D 70/23* (2018.01); *Y02D 70/26* (2018.01); *Y02D 70/444* (2018.01)

(56) References Cited

U.S. PATENT DOCUMENTS

| | | | | |
|---|---|---|---|---|
| 9,179,456 | B2* | 11/2015 | Han | H04W 72/042 |
| 9,445,409 | B2* | 9/2016 | Liao | H04W 72/042 |
| 9,549,400 | B2* | 1/2017 | Seo | H04B 7/0413 |
| 2008/0240030 | A1* | 10/2008 | Kolding | H04L 1/0025 |
| | | | | 370/329 |
| 2009/0268624 | A1 | 10/2009 | Imamura et al. | |
| 2010/0061346 | A1 | 3/2010 | Wang et al. | |
| 2010/0272019 | A1* | 10/2010 | Papasakellariou | H04B 7/0417 |
| | | | | 370/328 |
| 2010/0322171 | A1* | 12/2010 | Dekorsy | H04B 7/0621 |
| | | | | 370/329 |
| 2011/0038310 | A1* | 2/2011 | Chmiel | H04J 11/0069 |
| | | | | 370/328 |
| 2012/0021753 | A1* | 1/2012 | Damnjanovic | H04W 72/082 |
| | | | | 455/450 |
| 2012/0082052 | A1 | 4/2012 | Oteri et al. | |
| 2012/0176989 | A1 | 7/2012 | Papasakellariou et al. | |
| 2012/0320880 | A1* | 12/2012 | Han | H04L 5/001 |
| | | | | 370/335 |
| 2012/0322453 | A1* | 12/2012 | Weng | H04W 72/02 |
| | | | | 455/450 |
| 2013/0021926 | A1 | 1/2013 | Geirhofer et al. | |
| 2013/0034064 | A1* | 2/2013 | Nam | H04W 72/12 |
| | | | | 370/329 |
| 2013/0053077 | A1* | 2/2013 | Barbieri | H04B 7/0626 |
| | | | | 455/509 |
| 2013/0115999 | A1* | 5/2013 | Sirotkin | H04B 7/0617 |
| | | | | 455/522 |
| 2013/0137364 | A1* | 5/2013 | Redana | H04B 7/15528 |
| | | | | 455/9 |
| 2013/0188566 | A1* | 7/2013 | Zhu | H04W 72/042 |
| | | | | 370/329 |
| 2013/0188589 | A1* | 7/2013 | Nakashima | H04B 7/0404 |
| | | | | 370/329 |
| 2013/0194931 | A1* | 8/2013 | Lee | H04L 5/0053 |
| | | | | 370/241 |
| 2013/0194943 | A1* | 8/2013 | Davydov | H04L 5/0035 |
| | | | | 370/252 |
| 2013/0194950 | A1* | 8/2013 | Haghighat | H04W 24/02 |
| | | | | 370/252 |
| 2013/0244709 | A1* | 9/2013 | Davydov | H04W 28/0268 |
| | | | | 455/501 |
| 2013/0272214 | A1* | 10/2013 | Zhu | H04W 28/02 |
| | | | | 370/329 |
| 2013/0301465 | A1* | 11/2013 | Seo | H04B 7/0626 |
| | | | | 370/252 |
| 2014/0016596 | A1* | 1/2014 | Kim | H04L 5/001 |
| | | | | 370/329 |

(56) References Cited

U.S. PATENT DOCUMENTS

| | | | | |
|---|---|---|---|---|
| 2014/0078980 A1* | 3/2014 | Frenne | H04L 5/0007 | 370/329 |
| 2014/0119275 A1* | 5/2014 | Kim | H04L 5/0023 | 370/315 |
| 2014/0133336 A1* | 5/2014 | Park | H04W 24/10 | 370/252 |
| 2014/0211739 A1* | 7/2014 | Kim | H04L 5/0053 | 370/329 |
| 2014/0254708 A1* | 9/2014 | Seo | H04B 7/0626 | 375/267 |
| 2014/0293820 A1* | 10/2014 | Kim | H04J 11/005 | 370/252 |
| 2014/0314042 A1* | 10/2014 | Kim | H04L 1/0072 | 370/329 |
| 2014/0321406 A1* | 10/2014 | Marinier | H04B 7/024 | 370/329 |
| 2014/0328312 A1* | 11/2014 | Seo | H04L 1/1861 | 370/329 |
| 2014/0341093 A1* | 11/2014 | Seo | H04W 52/143 | 370/280 |
| 2015/0036616 A1* | 2/2015 | Lee | H04L 5/0023 | 370/329 |
| 2015/0117291 A1* | 4/2015 | Seo | H04L 5/001 | 370/312 |
| 2015/0117350 A1* | 4/2015 | Seo | H04L 1/06 | 370/329 |
| 2015/0124663 A1* | 5/2015 | Chen | H04L 5/0053 | 370/278 |
| 2015/0181568 A1* | 6/2015 | Seo | H04L 5/00 | 370/329 |
| 2015/0215905 A1* | 7/2015 | Park | H04B 7/0473 | 370/329 |

OTHER PUBLICATIONS

International Search Report and Written Opinion dated Mar. 20, 2014 for International Application No. PCT/US2013/075139, 14 pages.

* cited by examiner

PHYSICAL RESOURCE BLOCK (PRB)-RESTRICTED INTERFERENCE AVERAGING IN A WIRELESS COMMUNICATION SYSTEM

CROSS REFERENCE TO RELATED APPLICATIONS

The present application is a national phase entry under 35 U.S.C. § 371 of International Application No. PCT/US2013/075139, filed Dec. 13, 2013, entitled "PHYSICAL RESOURCE BLOCK (PRB)-RESTRICTED INTERFERENCE AVERAGING IN A WIRELESS COMMUNICATION SYSTEM", which claims priority to U.S. Provisional Application No. 61/771,698, filed Mar. 1, 2013, entitled "ADVANCED WIRELESS COMMUNICATION SYSTEMS AND TECHNIQUES." PCT/US2013/075139 designated, among the various States, the United States of America. The Specifications of the PCT/US2013/075139 Application and U.S. provisional application no. 61/771,698 are hereby fully incorporated by reference.

FIELD

Embodiments of the present invention relate generally to wireless networks and more particularly to interference averaging in wireless networks.

BACKGROUND

In some wireless communication networks, such as Long Term Evolution Advanced (LTE-A) networks, a user equipment (UE) measures interference on a channel of the network to generate channel state information (CSI) feedback. The UE sends the CSI feedback to an evolved Node B (eNB). However, the UE averages interference over the entire frequency bandwidth for generation of CSI.

BRIEF DESCRIPTION OF THE DRAWINGS

Embodiments will be readily understood by the following detailed description in conjunction with the accompanying drawings. To facilitate this description, like reference numerals designate like structural elements.

Embodiments are illustrated by way of example and not by way of limitation in the figures of the accompanying drawings.

DETAILED DESCRIPTION

Illustrative embodiments of the present disclosure include, but are not limited to, methods, systems, computer-readable media, and apparatuses for interference averaging in a wireless communication system.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in some embodiments" is used repeatedly. The phrase generally does not refer to the same embodiments; however, it may. The terms "comprising," "having," and "including" are synonymous, unless the context dictates otherwise.

The phrase "A and/or B" means (A), (B), or (A and B). The phrases "A/B" and "A or B" mean (A), (B), or (A and B), similar to the phrase "A and/or B."

As used herein, the term "circuitry" refers to, is part of, or includes hardware components such as an Application Specific Integrated Circuit (ASIC), an electronic circuit, a logic circuit, a processor (shared, dedicated, or group) and/or memory (shared, dedicated, or group) that are configured to provide the described functionality. In some embodiments, the circuitry may execute one or more software or firmware programs to provide at least some of the described functionality.

Figure 1:
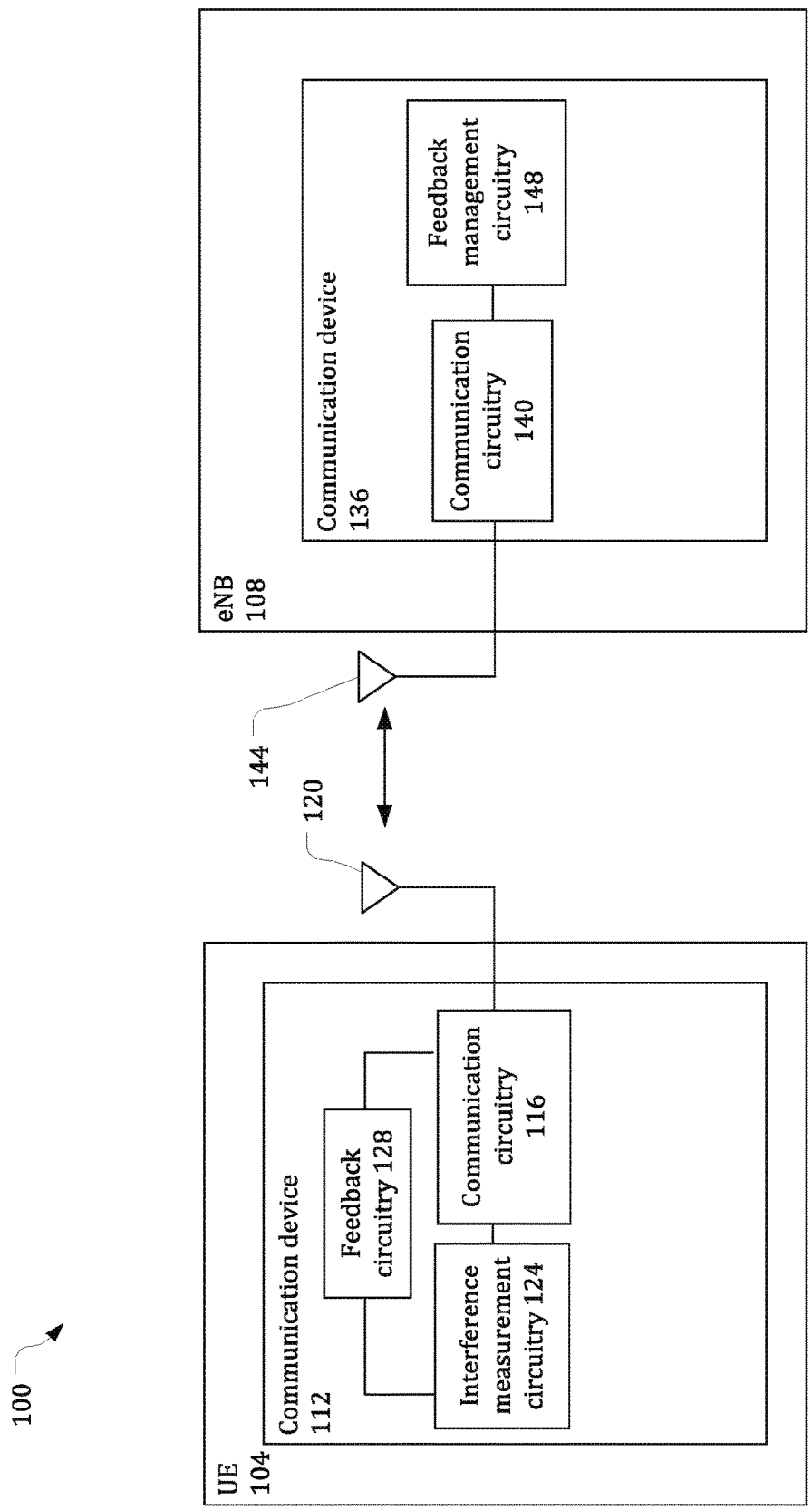
FIG. 1 schematically illustrates a high-level example of a network system comprising a user equipment (UE) and an evolved Node B (eNB), in accordance with various embodiments.

FIG. 1 schematically illustrates a network environment 100 in accordance with various embodiments. The network environment 100 includes a user equipment (UE) 104 wirelessly coupled with an evolved Node B (eNB) 108 of a radio access network (RAN) via an over-the-air (OTA) interface. The RAN may be part of a 3GPP LTE Advanced (LTE-A) network and may be referred to as an evolved universal terrestrial radio access network (EUTRAN). In other embodiments, other radio access network technologies may be utilized.

The UE 104 may include a communication device 112 that implements various communication protocols in order to effectuate communication with the eNB 108. The communication device 112 may be a chip, chipset, or other collection of programmed and/or preconfigured circuitry. In some embodiments, the communication device 112 may include or be part of baseband circuitry, radio-frequency circuitry, etc.

The communication device 112 may include communication circuitry 116 to wirelessly communicate with the eNB 108 over a channel of a wireless communication network (e.g., the RAN). The communication circuitry 116 may be coupled with one or more antennas 120 of the UE 104 to transmit wireless signals to, and/or receive wireless signals from, the eNB 108.

The communication circuitry 116 may communicate with the eNB 108 over a plurality of resource elements of the channel, each resource element corresponding to a time and frequency resource of the channel. The resource elements of the channel may be arranged in physical resource blocks (PRBs) that include a plurality of resource elements. The channel may include a plurality of sub-bands in the frequency domain, with each sub-band including a plurality of PRBs separated from one another in the frequency domain. The channel may further include a plurality of sub-frames in the time domain, with each sub-frame including a plurality of PRBs separated from one another in the time domain.

The communication device 112 may further include interference measurement circuitry 124 and feedback circuitry 128 coupled to the communication circuitry 116. The interference measurement circuitry 124 may measure interference and/or noise on the channel over which the UE 104 communicates with the eNB 108. In some embodiments, the interference measurements may be performed on CSI-interference measurement resource elements (CSI-IM REs) of the channel.

The feedback circuitry 128 may use one or more of the interference measurements to generate feedback information, such as channel state information (CSI), associated with the channel. In some embodiments, the CSI may include one or more channel quality indicators (CQIs).

It will be appreciated that the connections between the circuitry of the communication device 112 shown in FIG. 1 are presented as an example, and some embodiments may include fewer, additional, and/or different connections between the circuitry of communication device 112.

The eNB 108 may include a communication device 136 that implements various communication protocols in order to effectuate communication with the UE 104. The communication device 136 may be a chip, chipset, or other collection of programmed and/or preconfigured circuitry. In some embodiments, the communication device 136 may include or be part of baseband circuitry, radio-frequency circuitry, etc.

The communication device 136 may include communication circuitry 140 to wirelessly communicate with the UE 104. The communication circuitry 140 may be coupled with one or more antennas 144 of the eNB 108 to transmit wireless signals to, and/or receive wireless signals from, the UE 104. The communication device 136 may further include feedback management circuitry 148 coupled to the communication circuitry 140.

In various embodiments, the communication circuitry 116 of the UE 104 may receive, from the eNB 108, a feedback management message that defines one or more PRB sets. In some embodiments, the eNB 108 may transmit the feedback management message via radio resource control (RRC) signaling. Each of the one or more PRB sets may include one or more PRBs of the channel. For example, the message may define a first PRB set that includes at least one PRB of the channel and a second PRB set that includes at least one PRB of the channel. In some embodiments, the PRBs of the one or more PRB sets may be differentiated in the frequency domain. Additionally, or alternatively, in some embodiments, the PRBs of an individual PRB set may be non-contiguous. That is, the PRBs included in the PRB set may not all be consecutive in the frequency domain. Furthermore, in some embodiments, the different PRB sets may be non-overlapping (e.g., may not include any of the same PRBs).

Figure 2:
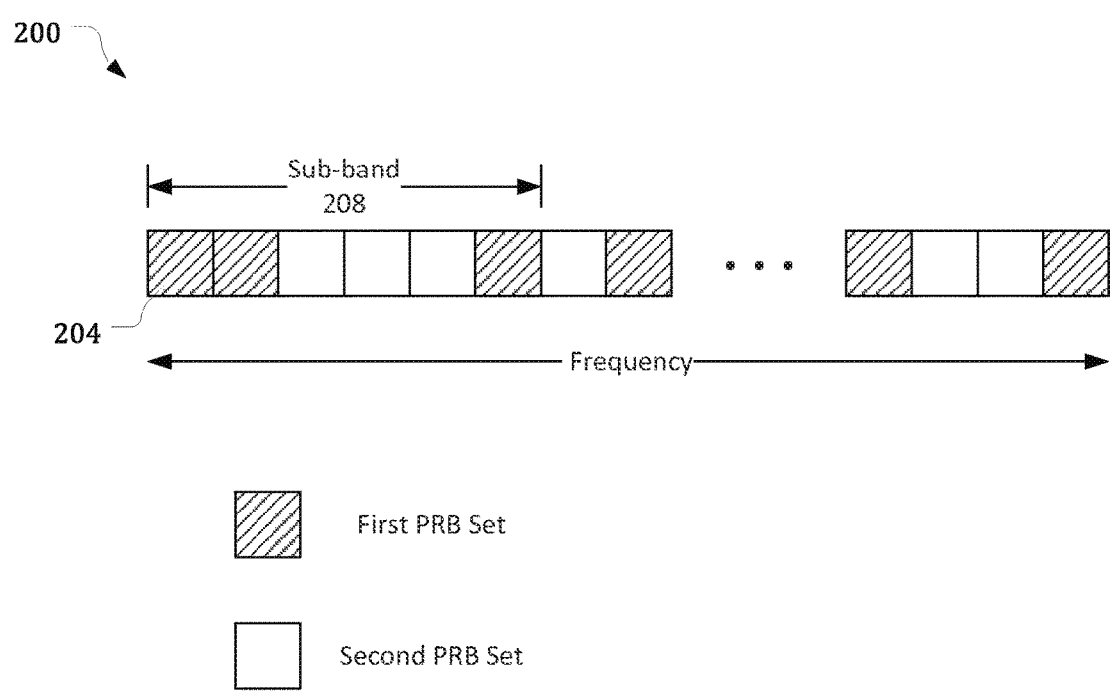
FIG. 2 schematically illustrates a wireless communication channel with a plurality of physical resource blocks (PRBs), showing PRBs assigned to a first PRB set and a second PRB set, in accordance with various embodiments.

FIG. 2 illustrates an example wireless communication channel 200 in accordance with various embodiments. The channel 200 includes a plurality of PRBs 204 differentiated from one another in the frequency domain. In some embodiments, the feedback management circuitry 148 of the eNB 108 may assign the PRBs to a first PRB set or a second PRB set, for example as shown. In some embodiments, at least one sub-band 208 of the channel 200 may include PRBs that are included in the first PRB set and PRBs that are included in the second PRB set. In some embodiments, the feedback management circuitry 148 may define more than two PRB sets.

In various embodiments, the interference measurement circuitry 124 may average interference measurements over the PRBs included in an individual PRB set. For example, the interference measurement circuitry 124 may average interference measurements for the PRBs of the first PRB set to obtain a first average interference measurement. Additionally, the interference measurement circuitry 124 may average interference measurements for the PRBs of the second PRB set to obtain a second average interference measurement. In some embodiments, the interference measurements may include CQIs.

In various embodiments, the feedback circuitry 128 may generate separate CSI reports for the individual PRB sets. The CSI reports may be based on the respective average interference measurements. For example, the feedback circuitry 128 may generate a first CSI report for the first PRB set based on the first average interference measurement. Additionally, the feedback circuitry 128 may generate a second CSI report for the second PRB set based on the second average interference measurement.

In various embodiments, the feedback circuitry 128 may transmit, via the communication circuitry 116, the first and second CSI reports to the eNB 108. The eNB 108 may schedule communications with the UE 104, and/or determine one or more parameters for communications with the UE 104, based on the first and second CSI reports.

Accordingly, the eNB 108 may send the feedback management message to instruct the UE 104 to generate separate CSI reports for the different PRB sets. In some embodiments, the eNB 108 may receive a relative narrowband transmit power (RNTP) message, for example from another eNB of the network 100. The RNTP message may indicate whether transmissions on individual PRBs of the channel are limited by a transmission power threshold. For example, transmissions on some PRBs of the channel may be limited to transmissions with a transmission power below the transmission power threshold as part of a frequency-domain inter-cell interference coordination (ICIC) scheme.

The feedback management circuitry 148 of the eNB 108 may determine the PRBs included in the first and second PRB sets based on the RNTP message. For example, the first PRB set may include PRBs of the channel, as indicated in the RNTP message, that are restricted to transmissions with a transmission power below the transmission power threshold (also referred to as protected PRBs). The second PRB set may include PRBs of the channel that are not restricted to transmissions with a transmission power below the transmission power threshold (also referred to as unprotected PRBs). The interference on the protected PRBs may be significantly different from the interference on the unprotected PRBs. Accordingly, the CSI feedback for the individual PRB sets, as described herein, may more accurately reflect the conditions on the PRBs compared with CSI feedback based on interference averaged across all of the PRBs of the channel.

Additionally, or alternatively, in some embodiments, the eNB 108 may schedule a communication with the UE 104 with a granularity of one PRB. For example, the eNB 108 may schedule a transmission to the UE 104 on the first PRB set. In some embodiments, the transmission may include an enhanced physical downlink control channel (ePDCCH). The CSI report for the first PRB set may enable the eNB 108 to determine one or more parameters for the transmission based on the average interference reported for the first PRB set. The parameters of the transmission that may be determined by the eNB 108 based on the CSI report for the first PRB set may include, for example, a transmit power, precoding parameters, and/or an aggregation level for the transmission.

In some embodiments, eNB 108 may define the first and second PRB sets using one or more bitmaps. For example, the feedback management message transmitted by the eNB 108 may include a bitmap having a plurality of bits, where individual bits of the bitmap correspond to respective PRBs of the channel. The individual bits may indicate whether the corresponding PRB is included in the first PRB set. For example, the individual bits may have a first logic value (e.g., a logic 1) to indicate that the corresponding PRB is included in the first PRB set or a second logic value (e.g., a logic 0) to indicate that the corresponding PRB is not included in the first PRB set. In some embodiments, the bits of the bitmap with the second logic value may also indicate that the corresponding PRBs are included in the second PRB set.

In other embodiments, the feedback management message may include a second bitmap to indicate the PRBs included in the second PRB set. The second bitmap may include a plurality of bits, with individual bits of the second bitmap corresponding to respective PRBs of the channel. The individual bits of the second bitmap may have the first logic value to indicate that the corresponding PRB is included in the second PRB set or the second logic value to indicate that the corresponding PRB is not included in the second PRB set. In some embodiments, additional bitmaps may be included in the message to define additional PRB sets.

Figure 3:
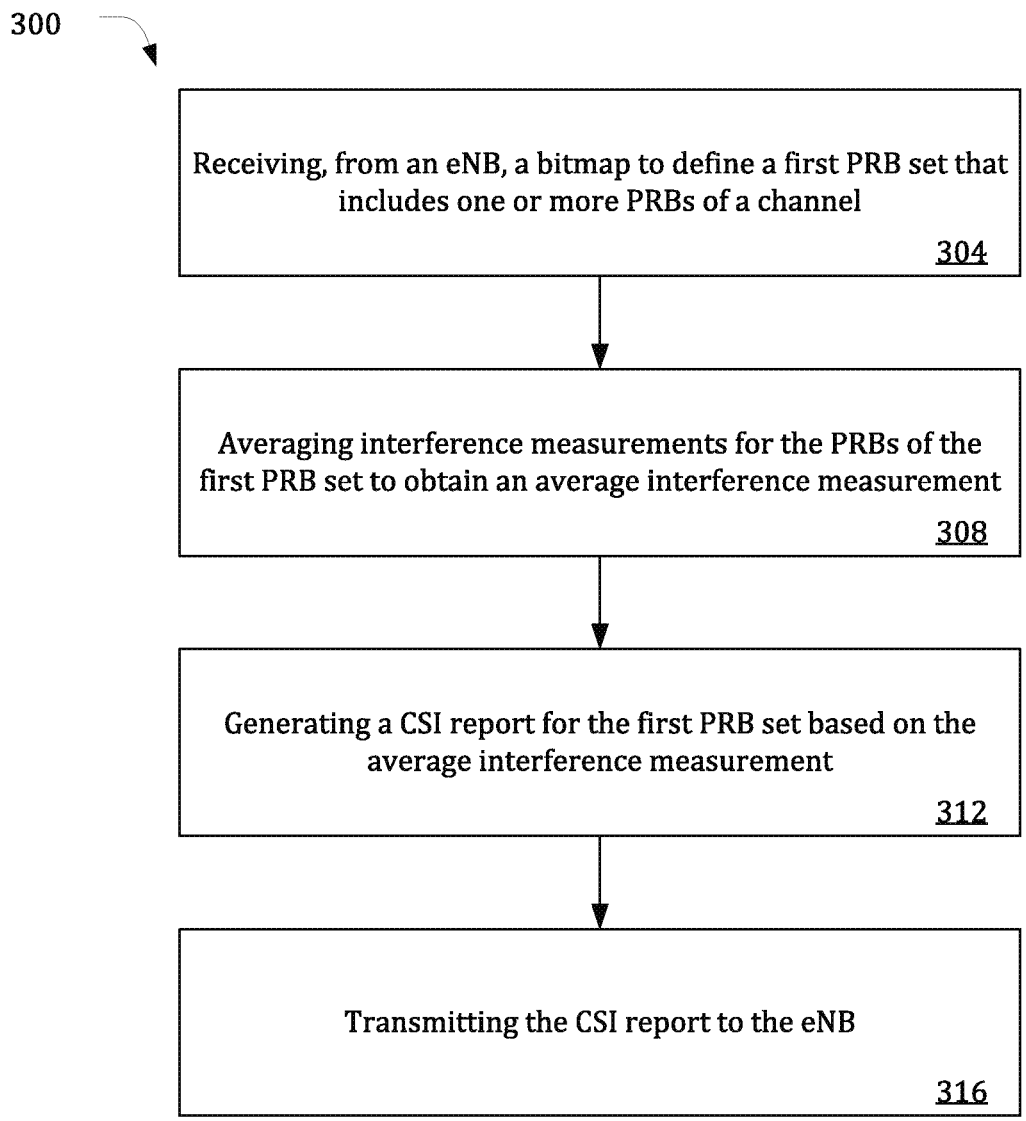
FIG. 3 illustrates a method for generating feedback information in accordance with various embodiments.

FIG. 3 illustrates a method 300 for generating feedback information that may be performed by a UE (e.g., UE 104) in accordance with various embodiments. In some embodiments, the UE may include one or more tangible computer-readable media having instructions, stored thereon, that when executed cause the UE to perform method 300.

At block 304, the method 300 may include receiving, from an eNB (e.g., eNB 108), a bitmap to define a first PRB set that includes one or more PRBs of a channel. For example, the bitmap may include a plurality of bits, where individual bits of the bitmap correspond to respective PRBs of a channel over which the UE communicates with the eNB. The individual bits of the bitmap may have a first logic value (e.g., logic 1) to indicate that the corresponding PRB is included in the first PRB set or a second logic value (e.g., logic 0) to indicate that the corresponding PRB is not included in the first PRB set. In some embodiments, the UE may receive the bitmap via RRC signaling. For example, the bitmap may be included in a feedback management message.

At block 308, the method 300 may include averaging interference measurements for the PRBs of the first PRB set to obtain an average interference measurement. In some embodiments, the interference measurements may include CQIs.

At block 312, the method 300 may include generating a CSI report for the first PRB set based on the average interference measurement.

At block 316, the method 300 may include transmitting the CSI report to the eNB.

In some embodiments, the UE may be configured with one or more additional PRB sets, including a second PRB set. In some embodiments, the second PRB set may be defined by the same bitmap that defines the first PRB set. For example, the individual bits of the bitmap that have the second value may indicate that the corresponding PRBs are included in the second PRB set. In other embodiments, the UE may receive a second bitmap that defines the second PRB set. The UE may average interference measurements for the PRBs of the second PRB set to obtain a second average interference measurement. The UE may further generate a CSI report for the second PRB set based on the second average interference measurement and transmit the CSI report for the second PRB set to the eNB.

Figure 4:
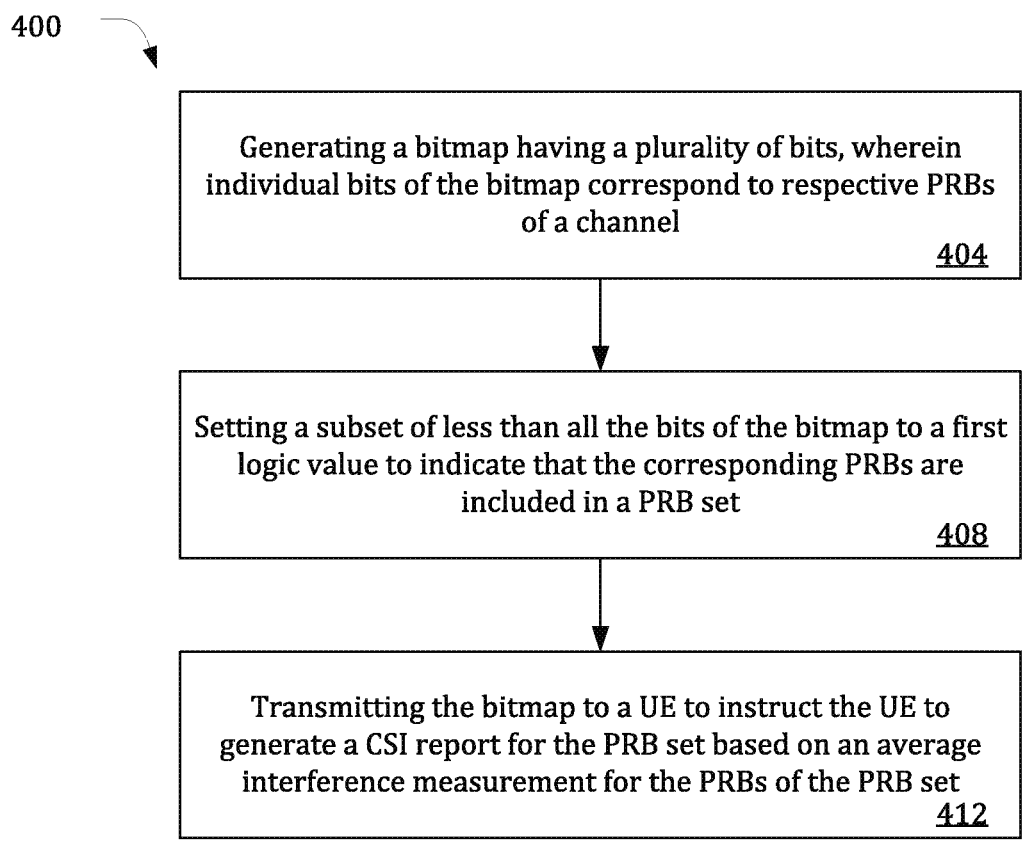
FIG. 4 illustrates a method for managing feedback information generated by a UE in accordance with various embodiments.

FIG. 4 illustrates a method for managing feedback information that may be performed by an eNB (e.g., eNB 108) in accordance with various embodiments. In some embodiments, the eNB may include one or more tangible computer-readable media having instructions, stored thereon, that when executed cause the eNB to perform method 400.

At block 404, the method 400 may include generating a bitmap having a plurality of bits, where individual bits of the bitmap correspond to respective PRBs of a channel, and where the PRBs are differentiated from one another in the frequency domain of the channel.

At block 408, the method 400 may include setting a subset of less than all the bits of the bitmap to a first logic value (e.g., logic 1) to indicate that the corresponding PRBs are included in a PRB set. The PRBs included in the PRB set may be non-contiguous in the frequency domain.

At block 412, the method 400 may include transmitting the bitmap to a UE (e.g., UE 108) to instruct the UE to generate a CSI report for the PRB set based on an average interference measurement for the PRBs of the PRB set.

The eNB may thereafter receive, from the UE, the CSI report for the PRB set. The eNB may schedule communications with the UE on the PRBs of the PRB set, and/or determine one or more parameters for communications on the PRBs of the PRB set, based on the CSI report. For example, the eNB may transmit an ePDCCH on one or more PRBs of the PRB set.

Figure 5:
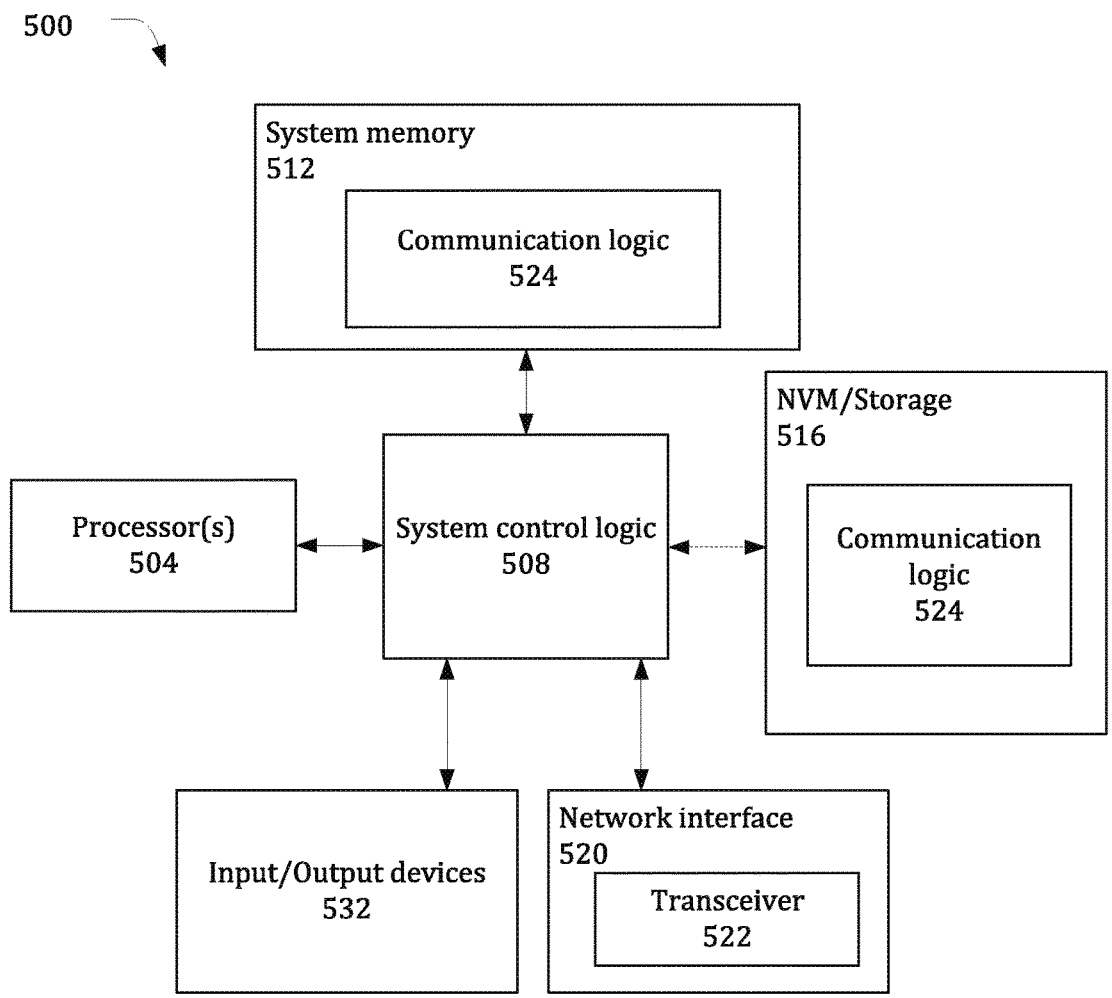
FIG. 5 schematically illustrates an example system that may be used to practice various embodiments described herein.

The UE 104 and eNB 108 described herein may be implemented into a system using any suitable hardware and/or software to configure as desired. FIG. 5 illustrates, for one embodiment, an example system 500 comprising one or more processor(s) 504, system control logic 508 coupled with at least one of the processor(s) 504, system memory 512 coupled with system control logic 508, non-volatile memory (NVM)/storage 516 coupled with system control logic 508, a network interface 520 coupled with system control logic 508, and input/output (I/O) devices 532 coupled with system control logic 508.

The processor(s) 504 may include one or more single-core or multi-core processors. The processor(s) 504 may include any combination of general-purpose processors and dedicated processors (e.g., graphics processors, application processors, baseband processors, etc.).

System control logic 508 for one embodiment may include any suitable interface controllers to provide for any suitable interface to at least one of the processor(s) 504 and/or to any suitable device or component in communication with system control logic 508.

System control logic 508 for one embodiment may include one or more memory controller(s) to provide an interface to system memory 512. System memory 512 may be used to load and store data and/or instructions, e.g., communication logic 524. System memory 512 for one embodiment may include any suitable volatile memory, such as suitable dynamic random access memory (DRAM), for example.

NVM/storage 516 may include one or more tangible, non-transitory computer-readable media used to store data and/or instructions, e.g., communication logic 524. NVM/storage 516 may include any suitable non-volatile memory, such as flash memory, for example, and/or may include any suitable non-volatile storage device(s), such as one or more hard disk drive(s) (HDD(s)), one or more compact disk (CD) drive(s), and/or one or more digital versatile disk (DVD) drive(s), for example.

The NVM/storage 516 may include a storage resource physically part of a device on which the system 500 is installed or it may be accessible by, but not necessarily a part of, the device. For example, the NVM/storage 516 may be accessed over a network via the network interface 520 and/or over Input/Output (I/O) devices 532.

The communication logic 524 may include instructions that, when executed by one or more of the processors 504, cause the system 500 to perform operations associated with the components of the communication device 112 or 136 as described with respect to the above embodiments. In various embodiments, the communication logic 524 may include hardware, software, and/or firmware components that may or may not be explicitly shown in system 500.

Network interface 520 may have a transceiver 522 to provide a radio interface for system 500 to communicate over one or more network(s) and/or with any other suitable device. In various embodiments, the transceiver 522 may be integrated with other components of system 500. For example, the transceiver 522 may include a processor of the processor(s) 504, memory of the system memory 512, and NVM/Storage of NVM/Storage 516. Network interface 520 may include any suitable hardware and/or firmware. Network interface 520 may include a plurality of antennas to provide a multiple input, multiple output radio interface.

Network interface 520 for one embodiment may include, for example, a wired network adapter, a wireless network adapter, a telephone modem, and/or a wireless modem.

For one embodiment, at least one of the processor(s) 504 may be packaged together with logic for one or more controller(s) of system control logic 508. For one embodiment, at least one of the processor(s) 504 may be packaged together with logic for one or more controllers of system control logic 508 to form a System in Package (SiP). For one embodiment, at least one of the processor(s) 504 may be integrated on the same die with logic for one or more controller(s) of system control logic 508. For one embodiment, at least one of the processor(s) 504 may be integrated on the same die with logic for one or more controller(s) of system control logic 508 to form a System on Chip (SoC).

In various embodiments, the I/O devices 532 may include user interfaces designed to enable user interaction with the system 500, peripheral component interfaces designed to enable peripheral component interaction with the system 500, and/or sensors designed to determine environmental conditions and/or location information related to the system 500.

In various embodiments, the user interfaces could include, but are not limited to, a display (e.g., a liquid crystal display, a touch screen display, etc.), speakers, a microphone, one or more cameras (e.g., a still camera and/or a video camera), a flashlight (e.g., a light emitting diode flash), and a keyboard.

In various embodiments, the peripheral component interfaces may include, but are not limited to, a non-volatile memory port, a universal serial bus (USB) port, an audio jack, an Ethernet connection, and a power supply interface.

In various embodiments, the sensors may include, but are not limited to, a gyro sensor, an accelerometer, a proximity sensor, an ambient light sensor, and a positioning unit. The positioning unit may also be part of, or interact with, the network interface 520 to communicate with components of a positioning network, e.g., a global positioning system (GPS) satellite.

In various embodiments, the system 500 may be a mobile computing device such as, but not limited to, a laptop computing device, a tablet computing device, a netbook, a smartphone, etc. In various embodiments, system 500 may have more or less components, and/or different architectures.

Some non-limiting examples are provided below.

Example 1 is an apparatus to be employed by a user equipment (UE) to generate feedback information, the apparatus comprising communication circuitry and feedback circuitry coupled to the communication circuitry. The communication circuitry is to: wirelessly communicate with an evolved Node B (eNB) via physical resource blocks (PRBs) of a channel; and receive, from the eNB, a message defining a first PRB set that includes one or more PRBs of the channel and a second PRB set that includes at least one PRB of the channel. The feedback circuitry is to: generate a first channel state information (CSI) report for the first PRB set based on a first average interference measurement for the one or more PRBs of the first PRB set; generate a second CSI report for the second PRB set based on a second average interference measurement for the at least one PRB of the second PRB set; and transmit, via the communication circuitry, the first and second CSI reports to the eNB.

Example 2 is the apparatus of Example 1, further comprising interference measurement circuitry to generate the first and second average interference measurements.

Example 3 is the apparatus of Example 1, wherein the PRBs of the first and second PRB sets are differentiated in a frequency domain.

Example 4 is the apparatus of Example 3, wherein a sub-band of the channel includes PRBs that are included in the first PRB set and PRBs that are included in the second PRB set.

Example 5 is the apparatus of Example 1, wherein the message includes a bitmap having a plurality of bits, wherein individual bits of the bitmap correspond to respective PRBs of the channel and wherein the individual bits indicate whether the corresponding PRB is included in the first PRB set.

Example 6 is the apparatus of Example 5, wherein the bitmap is a first bitmap, and wherein the message further includes a second bitmap having a plurality of bits, wherein individual bits of the second bitmap correspond to respective PRBs of the channel and wherein the individual bits of the second bitmap indicate whether the corresponding PRB is included in the second PRB set.

Example 7 is the apparatus of any one of Examples 1 to 6, wherein the PRBs included in the first PRB set are non-contiguous.

Example 8 is the apparatus of any one of Examples 1 to 6, wherein the first and second PRB sets are non-overlapping.

Example 9 is the apparatus of Example 1, wherein the apparatus is a mobile device with a touchscreen and one or more cameras.

Example 10 is an apparatus to be employed by an evolved Node B (eNB), the apparatus comprising communication circuitry and feedback management circuitry coupled to the communication circuitry. The communication circuitry is to communicate with a user equipment (UE) over physical resource blocks (PRBs) of a channel. The feedback management circuitry is to: generate a message defining a first PRB set that includes one or more PRBs of the channel and a second PRB set that includes at least one PRB of the channel; and transmit the message, via the communication circuitry, to the UE to instruct the UE to generate a first channel state information (CSI) report for the first PRB set based on a first average interference measurement for the one or more PRBs of the first PRB set and a second CSI report for the second PRB set based on a second average interference measurement for the at least one PRB of the second PRB set.

Example 11 is the apparatus of Example 10, wherein the communication circuitry is to receive a relative narrowband transmit power (RNTP) message from another eNB to indicate whether transmissions on individual PRBs of the channel are limited by a threshold, and wherein the feedback management circuitry is to determine the PRBs included in the first and second PRB sets based on the RNTP message.

Example 12 is the apparatus of Example 10, wherein the communication circuitry is further to receive the first and second CSI reports from the UE, and wherein the apparatus further comprises scheduling circuitry to schedule transmissions to the UE based on the first and second CSI reports.

Example 13 is the apparatus of Example 10, wherein the PRBs of the first and second PRB sets are differentiated in a frequency domain.

Example 14 is the apparatus of Example 10, wherein a sub-band of the channel includes PRBs that are included in the first PRB set and PRBs that are included in the second PRB set.

Example 15 is the apparatus of Example 10, wherein the message includes a bitmap having a plurality of bits, wherein individual bits of the bitmap correspond to respective PRBs of the channel and wherein the individual bits indicate whether the corresponding PRB is included in the first PRB set.

Example 16 is the apparatus of Example 15, wherein the bitmap is a first bitmap, and wherein the message further includes a second bitmap having a plurality of bits, wherein individual bits of the second bitmap correspond to respective PRBs of the channel and wherein the individual bits of the second bitmap indicate whether the corresponding PRB is included in the second PRB set.

Example 17 is the apparatus of any one of Examples 10 to 16, wherein the PRBs included in the first PRB set are non-contiguous.

Example 18 is the apparatus of any one of Examples 10 to 16, wherein the first and second PRB sets are non-overlapping.

Example 19 is a method to be performed by a user equipment (UE), the method comprising: receiving, from an evolved Node B (eNB) of a wireless communication network, a bitmap having a plurality of bits, wherein individual bits of the bitmap correspond to respective PRBs of a channel, and wherein the individual bits have a first logic value to indicate that the corresponding PRB is included in a PRB set or a second logic value to indicate that the corresponding PRB is not included in the PRB set; averaging interference measurements for the PRBs of the PRB set to obtain an average interference measurement; and generating a channel state information (CSI) report for the PRB set based on the average interference measurement.

Example 20 is the method of Example 19, wherein the PRBs of the channel are differentiated in a frequency domain and wherein the PRBs included in the PRB set are non-contiguous.

Example 21 is the method of Example 19 or 20, wherein the bitmap is a first bitmap, the PRB set is a first PRB set, and the CSI report is a first CSI report, and wherein the method further includes: receiving, from the eNB, a second bitmap having a plurality of bits, wherein individual bits of the second bitmap correspond to respective PRBs of the channel, and wherein individual bits have the second bitmap have the first logic value to indicate that the corresponding PRB is included in the second PRB set or the second logic value to indicate that the corresponding PRB is not included in the first PRB set; averaging interference measurements for the PRBs of the second PRB set to obtain a second average interference measurement; and generating a second CSI report for the second PRB set based on the second average interference measurement.

Example 22 is the method of Example 19 or 20, wherein the PRB set is a first PRB set, wherein the CSI report is a first CSI report, wherein the individuals bits of the bitmap that have the second logic value indicate that the corresponding PRB is included in a second PRB set, and wherein the method further includes: averaging interference measurements for the PRBs of the second PRB set to obtain a second average interference measurement; and generating a second CSI report for the second PRB set based on the second average interference measurement.

Example 23 is one or more tangible computer-readable media having instructions, stored thereon, that when executed cause an evolved Node B (eNB) to: generate a bitmap having a plurality of bits, wherein individual bits of the bitmap correspond to respective PRBs of a channel, the PRBs differentiated from one another in a frequency domain of the channel; set a subset of less than all the bits of the bitmap to a first logic value to indicate that the corresponding PRBs are included in a PRB set, wherein the PRBs included in the PRB set are non-contiguous in the frequency domain; and transmit the bitmap to a user equipment (UE) to instruct the UE to generate a channel state information (CSI) report for the PRB set based on an average interference measurement for the PRBs of the PRB set.

Example 24 is the one or more media of Example 23, wherein the bitmap is a first bitmap, the PRB set is a first PRB set, and the CSI report is a first CSI report, and wherein the instructions, when executed, further cause the eNB to: generate a second bitmap having a plurality of bits, wherein individual bits of the second bitmap correspond to respective PRBs of the channel, the PRBs differentiated from one another in the frequency domain of the channel; set a subset of less than all the bits of the second bitmap to the first value to indicate that the corresponding PRBs are included in a second PRB set, wherein the PRBs included in the second PRB set are non-contiguous in the frequency domain; and transmit the second bitmap to the UE to instruct the UE to generate a second CSI report for the second PRB set based on an average interference measurement for the PRBs of the second PRB set.

Example 25 is the one or more media of Example 23: wherein the PRB set is a first PRB set and the CSI report is a first CSI report; wherein bits of the bitmap other than the subset of less than all the bits have a second value to indicate that the corresponding PRBs are included in a second PRB set; and wherein the bitmap is further to instruct the UE to generate a second CSI report for the second PRB set based on an average interference measurement for the PRBs of the second PRB set.

Example 26 is an apparatus to be employed by an evolved Node B (eNB), the apparatus comprising: means to generate a bitmap having a plurality of bits, wherein individual bits of the bitmap correspond to respective PRBs of a channel, the PRBs differentiated from one another in a frequency domain of the channel; means to set a subset of less than all the bits of the bitmap to a first logic value to indicate that the corresponding PRBs are included in a PRB set, wherein the PRBs included in the PRB set are non-contiguous in the frequency domain; and means to transmit the bitmap to a user equipment (UE) to instruct the UE to generate a channel state information (CSI) report for the PRB set based on an average interference measurement for the PRBs of the PRB set.

Example 27 is the apparatus of Example 26, wherein the bitmap is a first bitmap, the PRB set is a first PRB set, and the CSI report is a first CSI report, and wherein the apparatus further comprises: means to generate a second bitmap having a plurality of bits, wherein individual bits of the second bitmap correspond to respective PRBs of the channel, the PRBs differentiated from one another in the frequency domain of the channel; means to set a subset of less than all the bits of the second bitmap to the first value to indicate that the corresponding PRBs are included in a second PRB set, wherein the PRBs included in the second PRB set are non-contiguous in the frequency domain; and means to transmit the second bitmap to the UE to instruct the UE to generate a second CSI report for the second PRB set based on an average interference measurement for the PRBs of the second PRB set.

Example 28 is the apparatus of Example 26: wherein the PRB set is a first PRB set and the CSI report is a first CSI report; wherein bits of the bitmap other than the subset of less than all the bits have a second value to indicate that the corresponding PRBs are included in a second PRB set; and wherein the bitmap is further to instruct the UE to generate a second CSI report for the second PRB set based on an average interference measurement for the PRBs of the second PRB set.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and the equivalents thereof.

What is claimed is:

1. An apparatus to be employed by a user equipment (UE) to generate feedback information, the apparatus comprising:
    communication circuitry to:
        wirelessly communicate with an evolved Node B (eNB) via physical resource blocks (PRBs) of a channel, wherein the PRBs are differentiated in a frequency domain; and
        receive, from the eNB, a message defining a first PRB set and a second PRB set for independent interference averaging by the UE, wherein the first PRB set includes one or more PRBs of the channel and the second PRB set includes at least one PRB of the channel; and
    feedback circuitry coupled to the communication circuitry, the feedback circuitry to:
        generate a first channel state information (C SI) report for the first PRB set based on a first average interference measurement for the one or more PRBs of the first PRB set;
        generate a second CSI report for the second PRB set based on a second average interference measurement for the at least one PRB of the second PRB set; and
        transmit, via the communication circuitry, the first and second CSI reports to the eNB.

2. The apparatus of claim 1, further comprising interference measurement circuitry to generate the first and second average interference measurements.

3. The apparatus of claim 1, wherein a sub-band of the channel includes PRBs that are included in the first PRB set and PRBs that are included in the second PRB set.

4. The apparatus of claim 1, wherein the message includes a bitmap having a plurality of bits, wherein individual bits of the plurality of bits of the bitmap correspond to respective PRBs of the channel and wherein the individual bits indicate whether the corresponding PRB is included in the first PRB set.

5. The apparatus of claim 4, wherein the bitmap is a first bitmap, and wherein the message further includes a second bitmap having a plurality of bits, wherein individual bits of the plurality of bits of the second bitmap correspond to respective PRBs of the channel and wherein the individual bits of the second bitmap indicate whether the corresponding PRB is included in the second PRB set.

6. The apparatus of claim 1, wherein the PRBs included in the first PRB set are non-contiguous in the frequency domain.

7. The apparatus of claim 1, wherein the first and second PRB sets are non-overlapping.

8. The apparatus of claim 1, wherein the apparatus is a mobile device with a touchscreen and one or more cameras.

9. An apparatus to be employed by an evolved Node B (eNB), the apparatus comprising:
    communication circuitry to communicate with a user equipment (UE) over physical resource blocks (PRBs) of a channel, wherein the PRBs are differentiated in a frequency domain; and
    feedback management circuitry coupled to the communication circuitry, the feedback management circuitry to:
        generate a message defining a first PRB set and a second PRB set for independent interference averaging by the UE, wherein the first PRB set includes one or more PRBs of the channel and the second PRB set includes at least one PRB of the channel; and
        transmit the message, via the communication circuitry, to the UE to instruct the UE to generate a first channel state information (CSI) report for the first PRB set based on a first average interference measurement for the one or more PRBs of the first PRB set and a second CSI report for the second PRB set based on a second average interference measurement for the at least one PRB of the second PRB set.

10. The apparatus of claim 9, wherein the communication circuitry is to receive a relative narrowband transmit power (RNTP) message from another eNB to indicate whether transmissions on individual PRBs of the channel are limited by a threshold, and wherein the feedback management circuitry is to determine the PRBs included in the first and second PRB sets based on the RNTP message.

11. The apparatus of claim 9, wherein the communication circuitry is further to receive the first and second CSI reports from the UE, and wherein the apparatus further comprises scheduling circuitry to schedule transmissions to the UE based on the first and second CSI reports.

12. The apparatus of claim 9, wherein a sub-band of the channel includes PRBs that are included in the first PRB set and PRBs that are included in the second PRB set.

13. The apparatus of claim 9, wherein the message includes a bitmap having a plurality of bits, wherein individual bits of the plurality of bits of the bitmap correspond to respective PRBs of the channel and wherein the individual bits indicate whether the corresponding PRB is included in the first PRB set.

14. The apparatus of claim 13, wherein the bitmap is a first bitmap, and wherein the message further includes a second bitmap having a plurality of bits, wherein individual bits of the plurality of bits of the second bitmap correspond to respective PRBs of the channel and wherein the individual bits of the second bitmap indicate whether the corresponding PRB is included in the second PRB set.

15. The apparatus of claim 9, wherein the PRBs included in the first PRB set are non-contiguous in the frequency domain.

16. The apparatus of claim 9, wherein the first and second PRB sets are non-overlapping.

17. A method to be performed by a user equipment (UE), the method comprising:
receiving, from an evolved Node B (eNB) of a wireless communication network, a bitmap having a plurality of bits, wherein individual bits of the plurality of bits correspond to respective physical resource blocks (PRBs) of a channel that are differentiated in a frequency domain to assign one or more of the respective PRBs to a PRB set for independent interference averaging by the UE, and wherein the individual bits have a first logic value to indicate that the corresponding PRB is included in the PRB set or a second logic value to indicate that the corresponding PRB is not included in the PRB set;
averaging interference measurements for the PRBs of the PRB set to obtain an average interference measurement; and
generating a channel state information (CSI) report for the PRB set based on the average interference measurement.

18. The method of claim 17, wherein the PRBs included in the PRB set are non-contiguous.

19. The method of claim 17, wherein the bitmap is a first bitmap, the PRB set is a first PRB set, and the CSI report is a first CSI report, and wherein the method further includes:
receiving, from the eNB, a second bitmap having a plurality of bits, wherein individual bits of the plurality of bits of the second bitmap correspond to respective PRBs of the channel to assign one or more of the respective PRBs to a second PRB set for independent interference averaging by the UE, and wherein individual bits have the second bitmap have the first logic value to indicate that the corresponding PRB is included in the second PRB set or the second logic value to indicate that the corresponding PRB is not included in the first PRB set;
averaging interference measurements for the PRBs of the second PRB set to obtain a second average interference measurement; and
generating a second CSI report for the second PRB set based on the second average interference measurement.

20. The method of claim 17, wherein the PRB set is a first PRB set, wherein the CSI report is a first CSI report, wherein the individual bits of the bitmap that have the second logic value indicate that the corresponding PRB is included in a second PRB set, and wherein the method further includes:
averaging interference measurements for the PRBs of the second PRB set to obtain a second average interference measurement; and
generating a second CSI report for the second PRB set based on the second average interference measurement.

21. One or more non-transitory computer-readable media having instructions, stored thereon, that when executed by one or more processors cause an evolved Node B (eNB) to:
generate a bitmap having a plurality of bits, wherein individual bits of the plurality of bits correspond to respective physical resource blocks (PRBs) of a channel, the PRBs differentiated from one another in a frequency domain of the channel;
set a subset of less than all the bits of the bitmap to a first logic value to indicate that the corresponding PRBs are included in a PRB set for independent interference averaging by the UE, wherein the PRBs included in the PRB set are non-contiguous in the frequency domain; and
transmit the bitmap to a user equipment (UE) to instruct the UE to generate a channel state information (C SI) report for the PRB set based on an average interference measurement for the PRBs of the PRB set.

22. The one or more non-transitory computer-readable media of claim 21, wherein the bitmap is a first bitmap, the PRB set is a first PRB set, and the CSI report is a first CSI report, and wherein the instructions, when executed by the one or more processors, further cause the eNB to:
generate a second bitmap having a plurality of bits, wherein individual bits of the plurality of bits of the second bitmap correspond to respective PRBs of the channel, the PRBs differentiated from one another in the frequency domain of the channel;
set a subset of less than all the bits of the second bitmap to the first logic value to indicate that the corresponding PRBs are included in a second PRB set for independent interference averaging by the UE, wherein the PRBs included in the second PRB set are non-contiguous in the frequency domain; and
transmit the second bitmap to the UE to instruct the UE to generate a second CSI report for the second PRB set based on an average interference measurement for the PRBs of the second PRB set.

23. The one or more non-transitory computer-readable media of claim 21:
wherein the PRB set is a first PRB set and the CSI report is a first CSI report;
wherein bits of the bitmap other than the subset of less than all the bits have a second logic value to indicate that the corresponding PRBs are included in a second PRB set; and
wherein the bitmap is further to instruct the UE to generate a second CSI report for the second PRB set based on an average interference measurement for the PRBs of the second PRB set.

* * * * *

UNITED STATES PATENT AND TRADEMARK OFFICE
CERTIFICATE OF CORRECTION

PATENT NO.         : 10,271,304 B2
APPLICATION NO.    : 14/764547
DATED              : April 23, 2019
INVENTOR(S)        : Alexei Davydov et al.

It is certified that error appears in the above-identified patent and that said Letters Patent is hereby corrected as shown below:

In the Claims

Column 12
Line 3, replace "state information (C SI) report" with -- state information (CSI) report --.

Column 13
Lines 57-59, replace "and wherein individual bits have the second bitmap have the first logic value" with -- and wherein individual bits of the second bitmap have the first logic value --.

Column 14
Line 30, replace "state information (C SI)" with -- state information (CSI) --.

Signed and Sealed this
Fourth Day of June, 2019

Andrei Iancu
*Director of the United States Patent and Trademark Office*